(12) United States Patent
Masuda et al.

(10) Patent No.: US 10,382,681 B2
(45) Date of Patent: *Aug. 13, 2019

(54) IMAGING SYSTEM

(71) Applicant: RICOH COMPANY, LTD., Tokyo (JP)

(72) Inventors: Kensuke Masuda, Kawasaki (JP); Noriyuki Terao, Sendai (JP); Yoshiaki Irino, Kawasaki (JP); Tomonori Tanaka, Yokohama (JP); Nozomi Imae, Yokohama (JP); Toru Harada, Kawasaki (JP); Hirokazu Takenaka, Kawasaki (JP); Hideaki Yamamoto, Yokohama (JP); Satoshi Sawaguchi, Yokohama (JP); Daisuke Bessho, Kawasaki (JP); Hiroyuki Satoh, Yokohama (JP); Makoto Shohara, Hachioji (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,170

(22) Filed: Mar. 26, 2018

(65) Prior Publication Data

US 2018/0213152 A1 Jul. 26, 2018

Related U.S. Application Data

(60) Division of application No. 15/648,966, filed on Jul. 13, 2017, now Pat. No. 9,992,414, which is a
(Continued)

(30) Foreign Application Priority Data

Mar. 16, 2012 (JP) .................................. 2012-060242
Dec. 20, 2012 (JP) .................................. 2012-277671

(51) Int. Cl.
*H04N 5/225* (2006.01)
*H04N 5/232* (2006.01)
(Continued)

(52) U.S. Cl.
CPC ......... *H04N 5/23238* (2013.01); *G02B 13/06* (2013.01); *H04N 5/2251* (2013.01);
(Continued)

(58) Field of Classification Search
None
See application file for complete search history.

(56) References Cited

U.S. PATENT DOCUMENTS

D401,257 S 11/1998 Iino
D464,664 S 10/2002 Huang
(Continued)

FOREIGN PATENT DOCUMENTS

JP 62-191838 8/1987
JP 7-26837 5/1995
(Continued)

OTHER PUBLICATIONS

Office Action dated Jul. 7, 2015 in Japanese Application No. 2012-277671 filed Dec. 20, 2012.
(Continued)

*Primary Examiner* — William B Perkey
(74) *Attorney, Agent, or Firm* — Xsensus LLP

(57) ABSTRACT

An imaging system includes an imaging body having an optical system and an imaging element, a power supplier configured to supply power to the imaging element, and a housing configured to hold the imaging body and the power supplier, wherein the optical system includes at least one optical element projecting from the housing, and a distance AP between a gravity center A of a portion including the optical system and a gravity center P of the entire imaging
(Continued)

system and a distance BP between a gravity center B of the power supplier and the gravity center P of the entire imaging system satisfy the following condition.

AP>BP

3 Claims, 5 Drawing Sheets

Related U.S. Application Data continuation of application No. 15/223,574, filed on Jul. 29, 2016, now Pat. No. 9,736,372, which is a continuation of application No. 14/854,595, filed on Sep. 15, 2015, now Pat. No. 9,456,113, which is a continuation of application No. 13/795,453, filed on Mar. 12, 2013, now Pat. No. 9,185,279.

(51) Int. Cl.
*G02B 13/06* (2006.01)
*G02B 5/04* (2006.01)

(52) U.S. Cl.
CPC ......... *H04N 5/2252* (2013.01); *H04N 5/2254* (2013.01); *H04N 5/23241* (2013.01); *G02B 5/04* (2013.01)

(56) References Cited

U.S. PATENT DOCUMENTS

| | | | |
|---|---|---|---|
| D467,259 S | 12/2002 | Hung et al. | |
| D479,850 S | 9/2003 | Zuang | |
| 7,333,143 B2 | 2/2008 | Saito | |
| 7,385,773 B2 | 6/2008 | Chang | |
| D576,654 S | 9/2008 | Kim et al. | |
| D614,683 S | 4/2010 | Oikawa et al. | |
| D617,821 S | 6/2010 | Kaplan et al. | |
| D618,264 S | 6/2010 | Chang et al. | |
| D620,037 S | 7/2010 | Kim et al. | |
| 7,782,375 B2 | 8/2010 | Chambers et al. | |
| D641,771 S | 7/2011 | Sasaki et al. | |
| D642,882 S | 8/2011 | Lane | |
| D659,732 S | 5/2012 | Kim et al. | |
| D663,343 S | 7/2012 | Choi | |
| 8,755,850 B2 | 6/2014 | Kang | |
| 8,908,015 B2 | 12/2014 | Filo et al. | |
| 9,185,279 B2 * | 11/2015 | Masuda | H04N 5/2251 |
| 9,456,113 B2 * | 9/2016 | Masuda | H04N 5/2251 |
| 9,736,372 B2 * | 8/2017 | Masuda | H04N 5/2251 |
| 9,992,414 B2 * | 6/2018 | Masuda | H04N 5/2251 |
| 2006/0072033 A1 | 4/2006 | Oran | |
| 2006/0165407 A1 | 7/2006 | Ueda et al. | |
| 2010/0045773 A1 | 2/2010 | Ritchey | |
| 2010/0289926 A1 | 11/2010 | Tanaka | |
| 2011/0157301 A1 | 6/2011 | Saitou et al. | |
| 2012/0206565 A1 | 8/2012 | Villmer | |
| 2013/0050405 A1 | 2/2013 | Masuda et al. | |
| 2015/0062363 A1 | 3/2015 | Takenaka | |
| 2015/0365596 A1 | 12/2015 | Hsiang | |
| 2016/0073024 A1 | 3/2016 | Yamamoto | |
| 2016/0156844 A1 | 6/2016 | Ogawa | |
| 2016/0337583 A1 | 11/2016 | Kang | |
| 2017/0054907 A1 | 2/2017 | Nishihara | |
| 2017/0110155 A1 | 4/2017 | Campbell | |
| 2017/0111559 A1 | 4/2017 | Abbas | |
| 2017/0111578 A1 | 4/2017 | Eromaki | |
| 2017/0192225 A1 | 7/2017 | Meierling | |
| 2017/0310895 A1 | 10/2017 | Masuda | |

FOREIGN PATENT DOCUMENTS

| | | |
|---|---|---|
| JP | 7-154703 | 6/1995 |
| JP | 7-319064 | 12/1995 |
| JP | 9-5879 A | 1/1997 |
| JP | 10-229539 | 8/1998 |
| JP | 10-243269 A | 9/1998 |
| JP | 2001-194711 A | 7/2001 |
| JP | 2006-211105 | 8/2006 |
| JP | 2006-293851 | 10/2006 |
| JP | 2005-278036 | 10/2008 |
| JP | 2009-37246 | 2/2009 |
| JP | 2010-60692 | 3/2010 |
| JP | 2010-245691 A | 10/2010 |
| JP | 2010-266505 | 11/2010 |
| KR | 10-1037870 B | 5/2011 |

OTHER PUBLICATIONS

Office Action dated Oct. 27, 2015 in Japanese Patent Application No. 2012-277671.
English Translation of Japanese Office Action dated Jul. 7, 2015 for Japanese Patent Application No. 2012-277671.
English Translation of Japanese Office Action dated Oct. 27, 2015 for Japanese Patent Application No. 2012-277671.
Office Action dated Jul. 4, 2017, in Japanese Patent Application No. 2016-009921.
Japanese Office Action dated Feb. 19, 2019, issued in corresponding JP Application No. 2018-109170, (with English translation) 6 pages.

* cited by examiner

IMAGING SYSTEM

CROSS REFERENCE TO RELATED APPLICATIONS

The present application is a division of U.S. application Ser. No. 15/648,966, filed Jul. 13, 2017, which is a continuation of U.S. application Ser. No. 15/223,574, filed Jul. 29, 2016 (now U.S. Pat. No. 9,736,372), which is a continuation of U.S. application Ser. No. 14/854,595 (now U.S. Pat. No. 9,456,113), filed Sep. 15, 2015, which is a continuation of U.S. application Ser. No. 13/795,453 (now U.S. Pat. No. 9,185,279), filed Mar. 12, 2013, which is based on and claims priority from Japanese Patent Application No. 2012-060242, filed on Mar. 16, 2012, and Japanese Patent Application No. 2012-277671, filed on Dec. 20, 2012, the disclosures of each of the above are hereby incorporated by reference in their entirety.

BACKGROUND

Field of the Invention

The present invention relates to an imaging system in which a lens surface projects from a housing.

Description of the Related Art

An imaging system using a plurality of wide-angle lenses such as a fisheye lens or a super-wide-angle lens is known as an imaging system which images all directions at one time. In such an imaging system, an image from each lens is projected on the same or corresponding sensor, and the projected images are combined by an image process, so as to produce an omnidirectional image.

When an imaging system is created with a small number of optical components, an angle of view assigned to each lens tends to be increased. For example, when photographing an omnidirectional image by using two fisheye lenses, each of the fisheye lenses requires a 180° or more angle of view.

A wide-angle lens, however, tends to have a small curvature radius on the incident side, and project from a housing. In an imaging system in which a lens surface projects from a housing, a lens is easily damaged when dropping the imaging system.

A technique described in Patent Document 1 (JP S62-191838A), for example, is known as a technique which protects a lens from being damaged. Patent Document 1 discloses a camera with a lens cover in which a push button for opening and closing a lens cover is provided in a side face of a lens barrel cover on a grip side. Such a technique described in Patent Document 1 requires the push button for opening and closing a lens cover, resulting in an increase in costs.

In the above-described imaging systems, in particular, an imaging system having a linear housing, an optical system, shutter button, and power supplier are often linearly arranged. A photographer holds such an imaging system between the gravity center of the imaging system and the position of the shutter button. When the arrangement of an optical system and a power supplier, which account for a substantial fraction of the weight of the imaging system, is inappropriate, camera shake easily occurs in the case of pushing the shutter button. It therefore becomes difficult for a photographer to stably perform photographing.

SUMMARY

The present invention has been made in view of the above circumstances, and an object of the present invention is to provide an imaging system in which a lens surface projects from a housing, and a balance of a center of a gravity is improved.

Another object of the present invention is to provide an imaging system in which a lens surface projects from a housing, and a possibility of lens surface damage in the case of dropping the imaging system is preferably decreased without adding a new component.

In order to achieve the above objects, one embodiment of the present invention provides an imaging system including an imaging body having an optical system and an imaging element, a power supplier configured to supply power to the imaging element, and a housing configured to hold the imaging body and the power supplier, wherein the optical system includes at least one optical element projecting from the housing, and a distance AP between a gravity center A of a portion including the optical system and a gravity center P of the entire imaging system and a distance BP between a gravity center B of the power supplier and the gravity center P of the entire imaging system satisfy the following condition.

$$AP > BP$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENTS

Hereinafter, embodiments of the present invention will be described. However, the present invention is not limited to the following embodiments. In the following embodiments, an omnidirectional imaging system 10 including an imaging body having two fisheye lenses in an optical system and a battery as a power supplier is described as one example of an imaging system.

Figure 1:
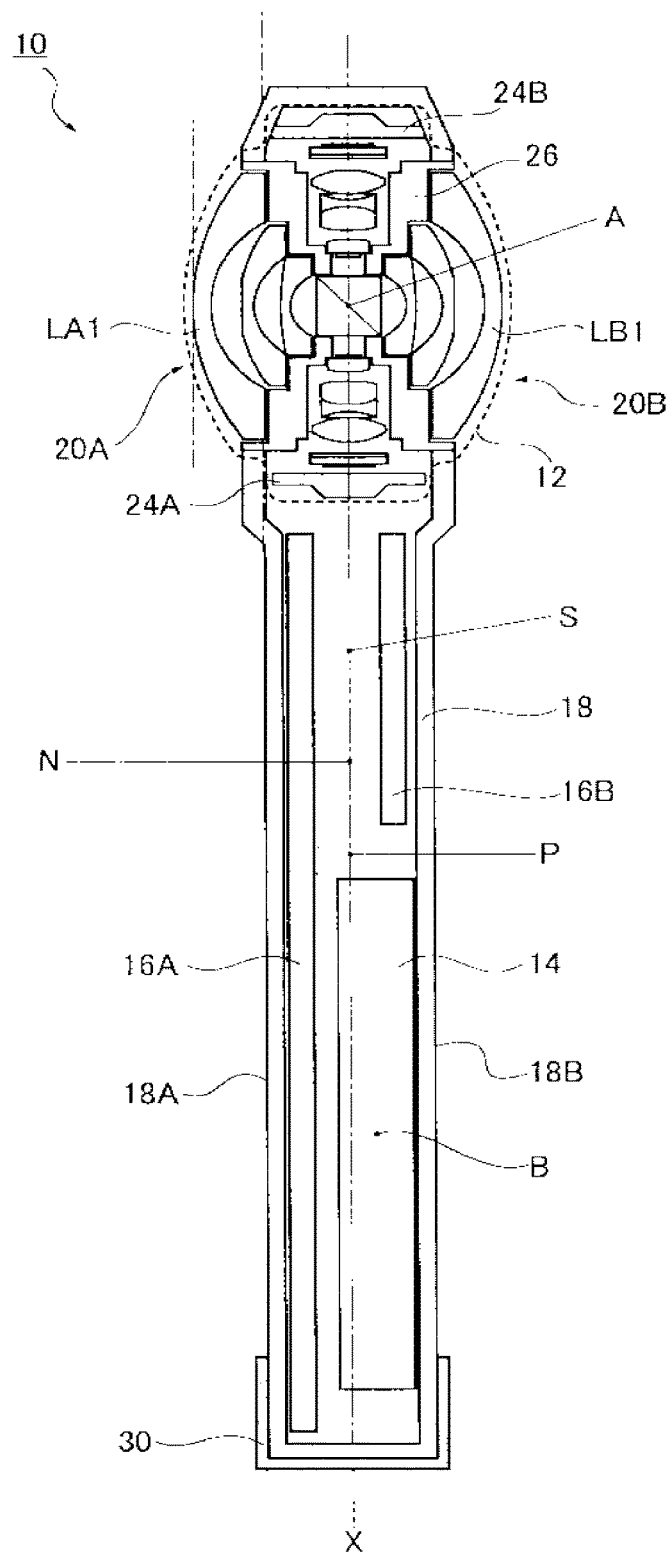
FIG. 1 is an overall view illustrating an omnidirectional imaging system according to an embodiment of the present invention.

FIG. 1 is an overall view illustrating the omnidirectional imaging system 10 according to the embodiment of the present invention. The omnidirectional imaging system 10 illustrated in FIG. 1 includes an imaging body 12, battery 14, controller boards 16A, 16B, and housing 18 which holds these components 12, 14, 16A, 16B. In the embodiment illustrated in FIG. 1, the imaging body 12 includes two image-forming optical systems 20A, 20B and two imaging elements 24A, 24B. An imaging optical system is made of the combination of one image-forming optical system 20 and one imaging element 24.

Each of the image-forming optical systems 20A, 20B illustrated in FIG. 1 is constituted as a fisheye lens of seven elements in six groups. The fisheye lens constituted by the image-forming optical system 20 includes an angle of view larger than 180° (=360°/n; n=2) in the embodiment illustrated in FIG. 1. It is preferable for the fisheye lens to include a 185° or more angle of view, and it is more preferable for the fisheye lens to include a 190° or more angle of view. With such an angle of view, images are synthesized by an image process based on an overlapped area.

Figure 2:
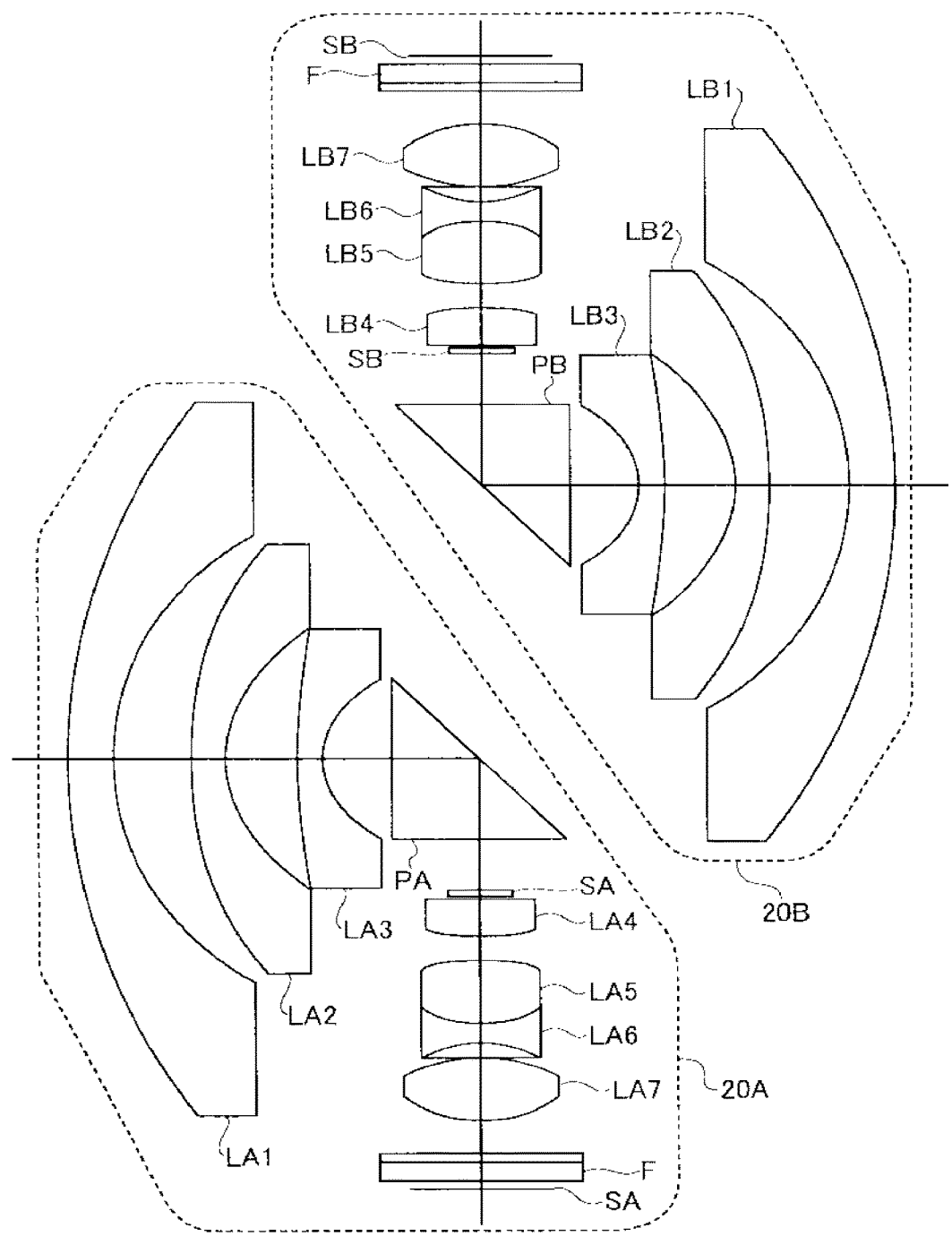
FIG. 2 is a detailed view illustrating two imaging optical systems in an imaging body of the omnidirectional imaging system according to the embodiment of the present invention.

FIG. 2 is a view illustrating the detailed configuration of the two image-forming optical systems 20A, 20B in the imaging body 12 illustrated in FIG. 1. The image-forming optical systems 20A, 20B are cemented with the respective prisms as an axis as illustrated in FIG. 1. However, in FIG. 2, the two image-forming optical systems 20A, 20B are separated for the sake of simplicity. As illustrated in FIG. 2, the first image-forming optical system 20A includes a front group having lenses LA1-LA3, a right angle prism PA as a reflection member, and a back group having lenses LA4-LA7. An aperture stop SA is disposed on the object side of the fourth lens LA4. In the first image-forming optical system 20A, a filter F and an aperture stop SA are disposed on the image side of the seventh lens LA7.

The image-forming optical system 20B includes a front group having lenses LB1-LB3, a right angle prism PB, and a back group having lenses LB4-LB7. An aperture stop SB is disposed on the object side of the fourth lens LB4. A filter F and an aperture stop SB are disposed on the image side of the seventh lens LB7.

In a specific embodiment, the lenses LA1-LA3 of the front group of the first image-forming optical system 20A are, in order form the object side, a negative meniscus lens (LA1) made of an optical glass material, a negative lens (LA2) made of a plastic resin material, and a negative meniscus lens (LA3) made of an optical glass material. The lenses LA4-LA7 of the back group are, in order from the object side, a biconvex lens (LA4) made of an optical glass material, a cemented lens of a biconcave lens (LA6) and a biconvex lens (LA5) made of an optical glass material, and a biconvex lens (LA7) made of a plastic resin material.

In a specific embodiment, the lenses LB1-LB3 of the front group of the second image-forming optical system 20B are, in order from the object side, a negative meniscus lens (LB1) made of an optical glass material, a negative lens (LB2) made of a plastic resin material, and a negative meniscus lens (LB3) made of an optical glass material. The lenses LB4-LB7 of the back group are, in order from an object side, a biconvex lens (LB4) made of an optical glass material, a cemented lens of a biconcave lens (LB6) and a biconvex lens (LB5) made of an optical glass material, and a biconvex lens (LB7) made of a plastic resin material.

In the first and second image-forming optical systems 20A, 20B, the negative lenses LA2, LB2 in the front groups, which are made of a plastic resin material, and the biconvex lenses LA7, LB7 in the back groups, which are made of a plastic resin material, have an aspheric surface on both surfaces. Each of the lenses made of an optical glass material is a spherical lens.

It is preferable for each of the right angle prisms PA, PB disposed between the front group and the back group to be formed by a material having a refractive index of d-line ($\lambda$=587.6 nm) larger than 1.8. The right angle prism PA, PB internally reflects the light from the front group toward the back group. The optical path of the imaging light beams therefore passes through the right angle prism PA, PB in each of the image-forming optical systems 20A, 20B. By constituting the right angle prism with a material having a high refractive index, the optical path length in the right angle prism PA, PB is increased, and the optical path length between the front group and the back group in the front group, the right angle prism and the back group can be increased to be larger than the mechanical length. Thus, the fisheye lens can be downsized.

By disposing the right angle prisms PA, PB near the aperture stops SA, SB, a right angle prism having a small outer diameter can be used, and the distance between the fisheye lenses can be reduced. Moreover, by adopting the arrangement of the right angle prisms PA, PB as illustrated in FIG. 2, the parallax of the two optical systems can be reduced. Furthermore, by disposing the two image-forming optical systems to face each other as illustrated in FIGS. 1, 2, the imaging system can be further downsized, and a non-imaging space can be reduced.

The optical elements (lens, prism, filter and aperture stop) of each of the two image-forming optical systems 20A, 20B are held by the lens barrel 26 relative to each of the imaging elements 24A, 24B such that the optical axes of the optical elements are located orthogonal to the central portion of the light-receiving area of the corresponding imaging element 24, and the light-receiving area becomes the imaging face of the corresponding fisheye lens. Namely, each of the image-forming optical systems 20 is positioned such that an image of an imaging target is imaged in the light-receiving area of the corresponding imaging element 24.

Each of the imaging elements 24 is a two-dimensional imaging element in which a light-receiving area forms an area, and converts the light collected by the corresponding image-forming optical system 20 into the image signals. Each of the imaging elements 24A, 24B includes a configuration in which tiny right-receiving areas are two-dimensionally arranged on the light-receiving surface. The information, which is photoelectrically converted in each of the tiny light-receiving areas, constitutes each pixel.

In the embodiment illustrated in FIG. 1, the image-forming optical systems 20A, 20B have the same specification, and are combined to be opposite to each other such that the optical axes are aligned. The omnidirectional imaging system 10 is configured to image omnidirectional image information by combining the two image-forming optical systems 20A, 20B and the two imaging elements 24A, 24B. By adopting the configuration illustrated in FIG. 1, an object above the housing 18 can be photographed.

The image obtained by the first image-forming optical system 20A is imaged on the light-receiving area of the two-dimensional imaging element 24A. The image obtained by the second image-forming optical system 20B is also imaged on the light-receiving area of the two-dimensional imaging element 24B. The imaging elements 24A, 24B convert the received light distribution into the image signals to be input to the controller boards 16A, 16B.

A not-shown image processor and output unit are provided on the controller boards 16A, 16B. The image signals output from the imaging elements 24A, 24B are input to the image processor on the controller board 16. The image processor synthesizes the image signals input from the imaging elements 24A, 24B into one image to obtain an image of solid angle of $4\pi$ radian (hereinafter referred to as an omnidirectional image), and outputs the image to the output unit. In the embodiment illustrated in FIG. 1, an omnidirectional image is formed, but a so-called panoramic image in which 360° only in a horizontal plane is photographed can be formed.

As described above, since the fisheye lens includes a 180° or more angle of view, the overlapped image portion is used as a reference for combining the images as standard data showing the same image when forming an omnidirectional image by synthesizing image signals output from the imaging elements 24A, 24B. The output unit is, for example, a display device, printer, or external memory such as an SD card or compact flash (registered trademark), and outputs the synthesized omnidirectional image.

The battery 14 is a power supplier which supplies power to a chip or a component on the controller boards 16A, 16B and the imaging elements 24A, 24B. The battery 14 is a primary battery such as an alkaline manganese primary battery or oxyride primary battery, or a secondary battery such as a lithium ion secondary battery, lithium ion polymer secondary battery or nickel hydride secondary battery.

The omnidirectional imaging system 10 illustrated in FIG. 1 includes a bar shape having one end provided with the image-forming optical system. The housing 18 includes a main body holding a module including the controller boards 16A, 16B and the battery 14, and a lens holder holding the imaging body 12 and provided with an opening from which the first lenses LA1, LB1 are exposed. The housing 18 includes flat housing faces 18A, 18B of the main body.

In the image-forming optical systems 20A, 20B illustrated in FIG. 1, the first lenses LA1, LB1 located on the most object side project from the housing faces 18A, 18B in the main body of the housing 18. In a specific embodiment, the first lenses LA1, LB1 are exposed outside the housing 18.

When the first lenses LA1, LB1 are made of an optical glass material, the lens surfaces may get cracked under a dropping condition from a height of about 1.5 m in a dropping test of the imaging optical system 20A. When the first lenses LA1, LB1 are made of a plastic resin material, the lens surfaces may be scratched under a dropping condition similar to the above. Namely, when a photographer drops the omnidirectional imaging system 10 by accident, the first lens may be damaged. When the first lenses LA1, LB1 are damaged, an image cannot be appropriately formed on the light-receiving surface of the imaging element 24; thus, it becomes difficult to obtain a preferable image.

The above-described imaging body 12 and the battery 14 are main members which account for a substantial fraction of the weight of the omnidirectional imaging system 10 illustrated in FIG. 10. For this reason, the omnidirectional imaging system 10 according to the present embodiment includes the following features regarding the arrangement of the imaging body 12 and the battery 14 as the main members, which account for a substantial fraction of the weight of the omnidirectional imaging system 10, based on the moment of the entire omnidirectional imaging system 10.

In the omnidirectional imaging system 10, a distance AP between a gravity center A of the imaging body 12 and a gravity center P of the entire omnidirectional imaging system 10 and a distance BP between a gravity center B of the battery 14 and the gravity center P of the entire omnidirectional imaging system 10 satisfy the following condition 1.

$$AP > BP \quad \text{(Condition 1)}$$

By satisfying the above condition 1, the gravity center P of the entire omnidirectional imaging system 10 is biased on the battery 14 side. With this configuration, when the omnidirectional imaging system 10 is dropped from a hand, for example, a possibility that the omnidirectional imaging system 10 drops from the side of the imaging body 12 having the projected optical elements can be decreased.

In a preferred embodiment, a shutter button can be disposed in a position S between the gravity center A of the imaging body 12 and the gravity center P of the entire omnidirectional imaging system 10. The shutter button is an input unit for starting imaging, which is pushed by a photographer for inputting an instruction to start imaging. It is preferable for the imaging body 12, shutter button and battery 14 to be arranged on the same straight line x in order of the gravity center A of the imaging body 12, the position S of the shutter button and the gravity center P of the entire omnidirecional imaging system 10. The shutter button is arranged on the front face of the housing 18.

Figure 5:
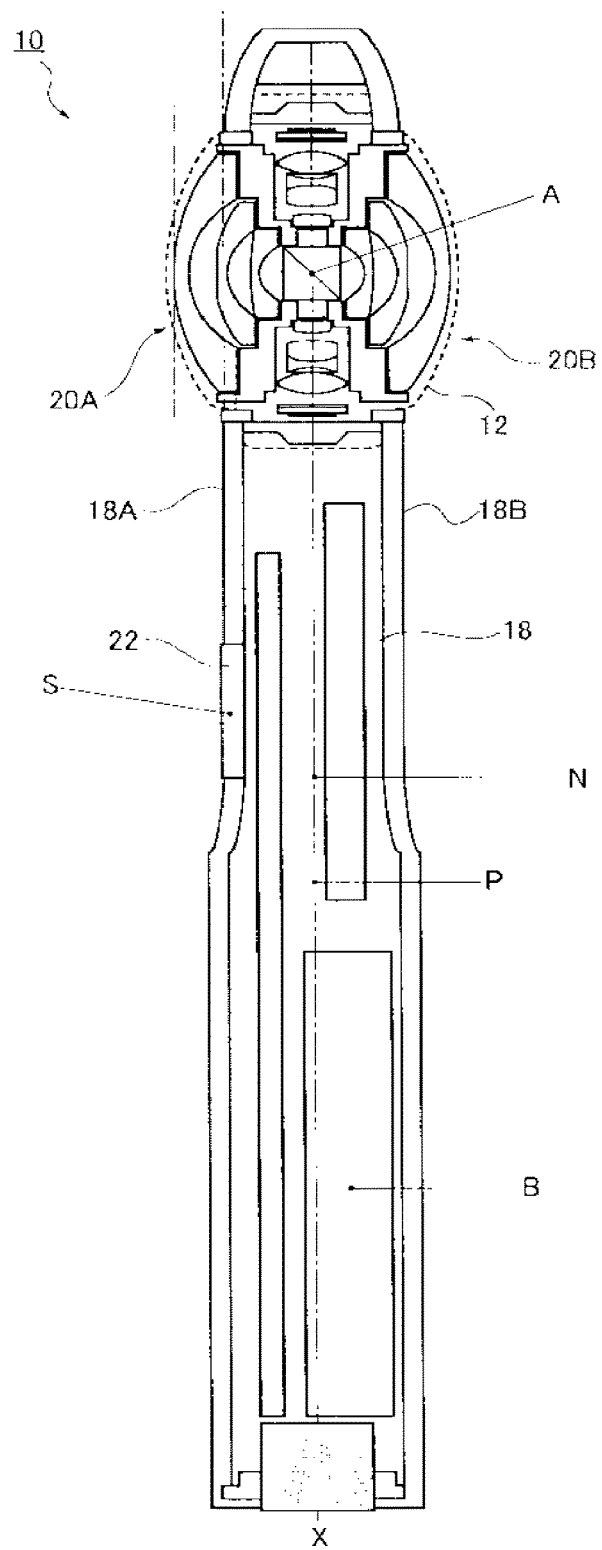
FIG. 5 is an overall view illustrating an omnidirectional imaging system according to another embodiment of the present invention.
Figure 6:
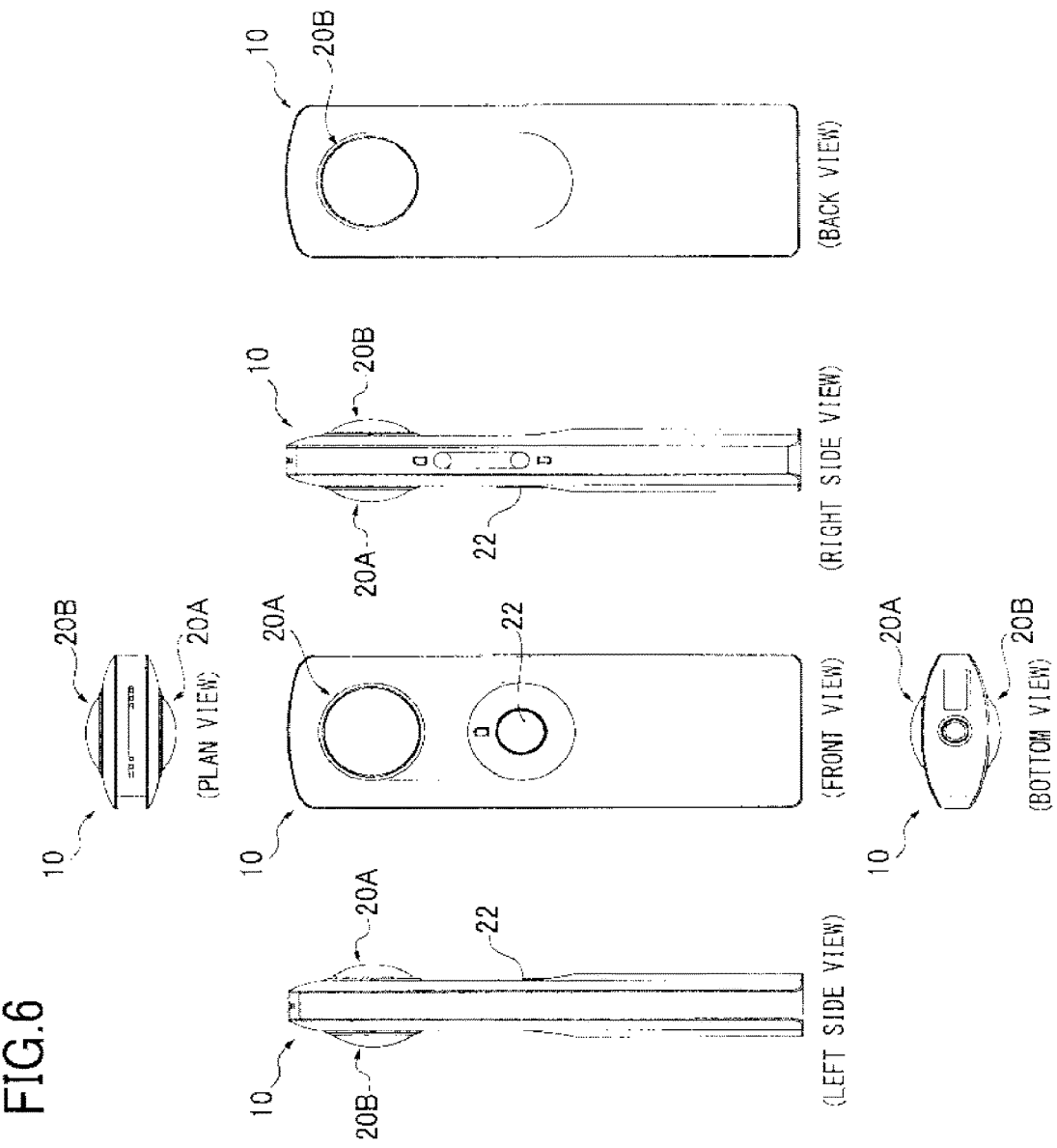
FIG. 6 is view illustrating six planes of an omnidirectional imaging system according to another embodiment of the present invention.

The arrangement of the shutter button is not limited to the arrangement illustrated in FIG. 1. FIG. 5 is an overall view illustrating an omnidirectional imaging system 10 according to another embodiment. In the omnidirectional imaging system 10 illustrated in FIG. 5, the shutter button 22 is located on the left side of the straight line x, namely, below the left side of the image-forming optical system 20. Similar to the arrangement in FIG. 1, the gravity center A of the imaging body 12, the position S of the shutter button and the gravity center P of the omnidirectional imaging system 10 are arranged in order of the gravity center A, the position S and the gravity center P. FIG. 6 is a view illustrating six planes of the omnidirectional imaging system 10 according to another embodiment.

In order to stably hold the omnidirectional imaging system 10, it is preferable for a photographer to hold the omnidirectional imaging system 10 near the center N of the shape the omnidirectional imaging system 10, namely, between the position S and the position P. A photographer pushes the shutter button disposed on the imaging body 12 side of the gravity center P with the above-described held condition. In this case, by adopting the arrangement in which the gravity center P is biased on the battery 14 side away from the imaging body 12, camera shake which causes a deterioration in an image quality is controlled because the moment on the battery 14 side is larger even if the shutter button is pushed. A photographer therefore stably photographs an image by using the omnidirectional imaging system 10.

In addition, the three dimensional gravity center of each of the members 12, 14 can be specified by measuring the gravity center in the two-dimensional direction of each of the members multiple times by using a load cell (mass-measuring instrument). In the embodiment, the gravity center A is the gravity center of the entire imaging body 12 including the two image-forming optical systems 20A, 20B, lens barrel 26 and imaging elements 24A, 24B. However, in another embodiment, the gravity center of the portion including the two image-forming optical systems 20A, 20B and the lens barrel 26 without including the imaging elements 24A, 24B can be the gravity center A. In addition, the gravity center B is the gravity center of the battery 14 without including a cable which connects the battery 14 to the imaging element 24 in this embodiment.

In the omnidirectional imaging system 10, it is preferable for a weight m of the imaging body 12 and a weight M of the battery 14 to satisfy the following condition 2.

$$m < M \quad \text{(Condition 2)}$$

In the omnidirectional imaging system 10, it is preferable for the weight m of the imaging body 12, the weight M of the battery 14, a distance AN between the gravity center A of the imaging body 12 and the center N of the shape of the entire omnidirectional imaging system 10, and a distance BN between the gravity center B of the battery 14 and the center N to satisfy the following condition 3.

$$m \times AN < M \times BN \quad \text{(Condition 3)}$$

By satisfying the above conditions 2, 3, the gravity center P of the entire omnidirectional imaging system 10 is biased on the battery 14 side. With this configuration, when the omnidirectional imaging system 10 drops from a hand, for example, a possibility that the imaging system 10 is dropped from the side of the imaging body 12 having the projected optical elements can be decreased.

The above described arrangement is especially effective for an imaging system in which the first lenses LA1, LB1 project from the housing faces 18A, 18B, and also especially effective for an imaging system in which the sag amount of the first lenses LA1, LB1 becomes 3 mm or more. This is because cracking becomes remarkable in a lens made of an optical glass material and scratching becomes remarkable in a lens made of a plastic resin material in the dropping test from 1.5 m when the sag amount of the first lenses LA1, LB1 becomes 3 mm or more. In addition, the sag amount shows a sag amount in an effective diameter, and does not include a sag amount of a non-effective diameter.

Figure 3:
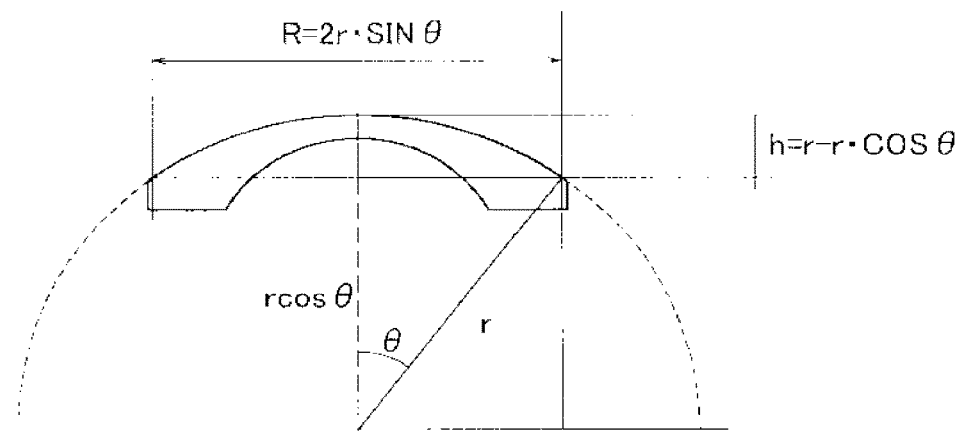
FIG. 3 is a view describing a sag amount in a first lens LA1, LA2.

The above sag amount h is defined as illustrated in FIG. 3. It is preferable for a curvature radius r of the convex lens of the first lens LA1, LB1 and an effective diameter (diameter) R of the first lens LA1, LB1 to satisfy the following condition 4 by normalizing with the curvature radius r.

$$1 - \cos \{ \sin^{-1}(R/2r) \} \geq 0.17 \quad \text{(Condition 4)}$$

For example, when the curvature radius r of the convex lens of the first lens LA1, LB1 is 18 mm and the effective diameter R of the first lens LA1, LB1 is 20 mm, the sag amount h of the first lens becomes about 3.03 mm, and the value (h/r) in which the sag amount h is normalized by the curvature radius r becomes about 0.17. The above condition 4 therefore is satisfied.

Moreover, when the curvature radius r of the convex lens of the first lens LA1, LB1 is 17 mm and the effective diameter R of the first lens LA1, LB1 is 20 mm, the sag amount h of the first lens becomes about 3.25 mm, and the value (h/r) in which the sag amount h is normalized by the curvature radius r becomes about 0.19. The above condition 4 therefore is satisfied.

Furthermore, when the curvature radius r of the convex lens of the first lens LA1, LB1 is 10 mm and the effective diameter R of the first lens LA1, LB1 is 20 mm, the sag amount h of the first lens becomes about 10.00 mm, and the value (h/r) in which the sag amount h is normalized by the curvature radius r becomes about 1. The above condition 4 therefore is satisfied. In addition, the upper limit of the normalized value (h/r) is 1.

Hereinafter, a material for achieving the arrangement of the imaging body 12 and the battery 14 satisfying the above conditions 1-3 will be described.

In order to reduce the weight m of the imaging body 12 to be lower than the weight M of the battery 14, namely, to satisfy the above condition 3, a material having a small specific gravity is adopted for the lens for use in the image-forming optical system 20 of the imaging body 12. As described above, the image-forming optical system 20 includes seven lenses in six groups according to a specific embodiment. In such a configuration, the second lens LA2, LB2 from the object side and the seventh lens LA7, LB7 from the object side are made of a plastic resin material. In another embodiment, the plastic resin material is not limited to the second lens LA2, LB2 and the seventh lens LA7, LB7, and all or a part of the lenses LA1-LA7, LB1-LB7 can be made of a plastic resin material.

It is preferable for the material of the lens to use a plastic resin material having a specific gravity of 2.5 g/cm$^3$ or below (unit will be hereinafter omitted). Such a plastic resin material includes cycloolefin resin (specific gravity 1.1), episulfide series resin (specific gravity 1.46), thiourethane series resin (specific gravity 1.35), (polyester) methacrylate (specific gravity 1.37), polycarbonate (specific gravity 1.20), (urethane) methacrylate (specific gravity 1.17), (epoxy) methacrylate (specific gravity 1.19), diallyl carbonate (specific gravity 1.23), diallyl phthalate series resin (specific gravity 1.27), urethane series resin (specific gravity 1.1), polymethylmethacrylate (specific gravity 1.18) and allyl diglycol carbonate (specific gravity 1.32). It is more preferable for the material of the lens to use a plastic resin material having a specific gravity of 1.1 or more and less than 1.25 such that the specific gravity is decreased twice or more the specific gravity (2.5) of glass.

In order to satisfy the above condition 3, it is also preferable for the material of the lens barrel 26 holding a lens to use a material having a small specific gravity. It is preferable for the material of the lens barrel to use a plastic resin material having a specific gravity smaller than 2.7 g/cm$^3$. A complex material of resin such as polycarbonate resin (PC), polyphenylene sulfide resin (PPS), acrylonitrile butadiene styrene resin (ABS), polybutylene terephthalate (PBT), polyethylene terephthalate resin (PET), polystyrene resin (PS), polyphenyleneether resin (PPE), and polyamide resin (PA), and filler such as glass fiber, carbon fiber, and carbon fiber, for example pitch series or PAN (polyacrylonitrile) series can be used as the plastic resin material of the lens barrel.

It is more preferable for the plastic resin material of the lens barrel to use a plastic resin material having a specific gravity of 1.3 or more and less than 1.35 which is decreased twice or more the specific gravity (2.7) of aluminum. A polycarbonate material with glass can be used as the material for forming the lens barrel.

As illustrated in FIG. 1, the omnidirectional imaging system 10 includes an impact absorber 30. The impact absorber is provided near the battery 14 in the exterior of the housing 18. A low-modulus rubber material such as low resilient urethane rubber or an impact absorbing gel molded material can be used for the impact absorber.

With the above-described arrangement, when the omnidirectional imaging system 10 is dropped from a hand, the imaging system 10 tends to drop from the battery 14 side. The housing 18 and the module can be protected in such dropping by the impact absorber 30.

In the above embodiment, the omnidirectional imaging system which can photograph all directions by using the two imaging optical systems is described. However, the embodiment is not limited to the combination of the two imaging optical systems, and it can be applied to a monocular bar type camera. In the above description, the fisheye lens in which the distortion is not corrected is described as one example, but the omnidirectional imaging system can be constituted by using a super-wide-angle lens in which the distortion is corrected.

Moreover, the above embodiment can be applied to an imaging system which can photograph all directions by using n-imaging optical systems where n is a natural number larger than 2. For example, an imaging system can be constituted by radially disposing three wide-angle lenses (image-forming optical system) having an angle of view larger than 360°/3=120° in the same plane, and combining the lenses with imaging elements, respectively. An image to be obtained with this system is not an omnidirectional image, but such a system can image a horizontal panoramic image of 360°, and is preferable for a car-mounted camera or security camera. The image can be a still image or moving image.

Figure 4:
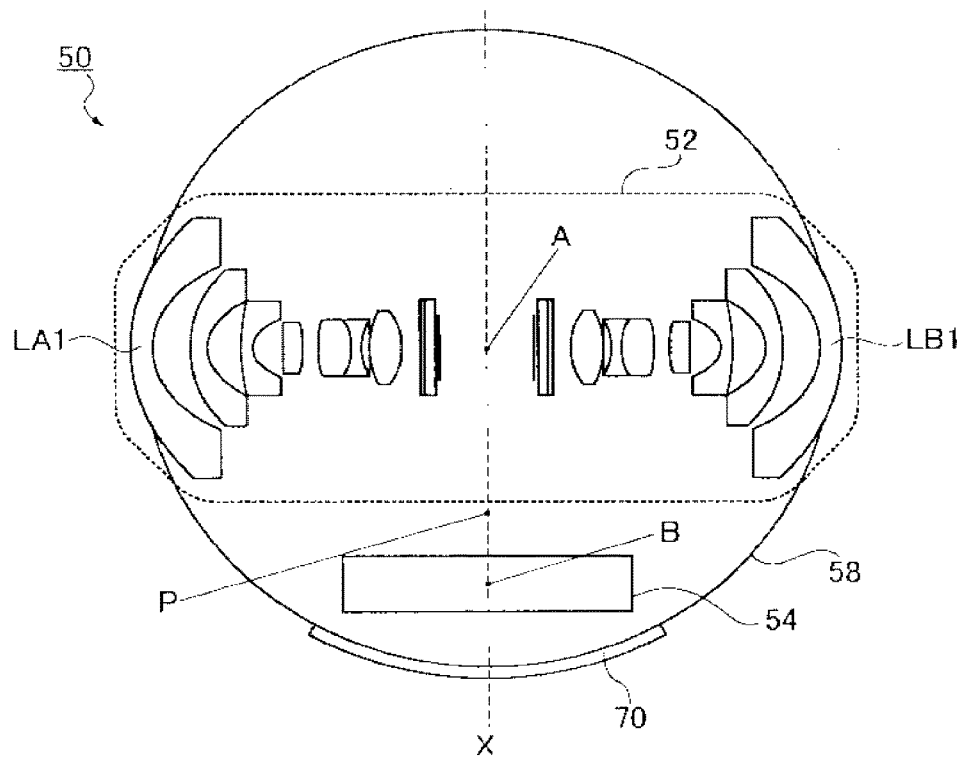
FIG. 4 is an overall view illustrating an omnidirectional imaging system according to another embodiment of the present invention.

In the above embodiment, the omnidirectional imaging system having a linear shape is described. However, the above-described arrangement can be applied to an omnidirectional imaging system having another shape. FIG. 4 is a view illustrating an entire omnidirectional imaging system according to another embodiment. In addition, since an omnidirectional imaging system 50 according to the embodiment illustrated in FIG. 4 includes a configuration similar to that of the omnidirectional imaging system 10 of the embodiment illustrated in FIG. 1, differences between the embodiment illustrated in FIG. 1 and the embodiment illustrated in FIG. 4 will be mainly described in the following description.

The omnidirectional imaging system 50 according to another embodiment illustrated in FIG. 4 includes an imaging body 52, battery 54, not-shown controller board, and housing 58 which holds these components. In the embodiment illustrated in FIG. 4, the imaging body 52 includes two image-forming optical systems as a fisheye lens having seven lenses in six groups and two imaging elements similar to the embodiment illustrated in FIG. 1. The image-forming optical system illustrated in FIG. 4 includes a configuration similar to the embodiment illustrated in FIGS. 1, 2, but does not have a right angle prism between the front group and the back group, and the image-forming optical systems are combined to be opposite to each other with their optical axes aligned.

The omnidirectional imaging system 50 illustrated in FIG. 4 includes a spherical shape provided with an imaging optical system on both sides. The housing 58 includes a main body which holds the imaging body 52, controller board and battery 54. An opening from which the first lenses LA1, LB2 are exposed is provided in the main body of the housing 58. In the image-forming optical system illustrated in FIG. 4, the first lenses LA1, LB2 located on the most object side project from the surface of the housing 58 and are exposed outside the housing 58.

Similar to the omnidirectional imaging system 10 illustrated in FIG. 4, the imaging body 52 and the battery 54 become the main members which account for a substantial fraction of the weight of the omnidirectional imaging system 50 illustrated in FIG. 4. In this case, in the omnidirectional imaging system 50 according to the embodiment illustrated in FIG. 4, the arrangement of the imaging body 52 and the battery 54 of the main members which account for a substantial fraction of the weight of the omnidirectional imaging system 50 has the following feature.

In the omnidirectional imaging system 50 according to another embodiment illustrated in FIG. 4, a distance AP between a gravity center A of the imaging body 52 and a gravity center P of the entire omnidirectional imaging system 50 and a distance BP between a gravity center B of the battery 54 and the gravity center P of the entire omnidirectional imaging system 50 satisfy the above condition 1.

By satisfying the above condition 1, the gravity center P of the entire spherical omnidirectional imaging system 50 illustrated in FIG. 4 is biased on the battery 54 side as the omnidirectional imaging system 10 illustrated in FIG. 1. Moreover, by providing an impact absorber 70 near the battery 54 in the exterior of the housing 58, the housing 58 can be preferably protected in dropping.

Since a condition which defines another arrangement is similar to that illustrated in FIG. 1, the detailed description thereof will be omitted.

As described above, according to the embodiments of the present invention, an imaging system in which the lens surface projects from the housing, and the balance of the gravity center is improved can be provided. In addition, in the imaging system, a possibility of lens surface damage when dropping the imaging system can be preferably decreased without adding a new member.

Hereinafter, the imaging system according to the embodiments of the present invention will be described in details by using the following Embodiments. However, the present invention is not limited to the following Embodiments.

[Embodiment 1]

The omnidirectional imaging system 10 having a linear shape illustrated in FIG. 1 was obtained. Each of the image-forming optical systems 20A, 20B had seven lenses in six groups. In this configuration, the second lens LA2, LB2 from the object side and the seventh lens LA7, LB7 from the object side were a plastic lens. The plastic lens was formed by using a plastic resin material (specific weight 1.1) of E48R of Zeonex (registered trademark). The lens barrel 26 was formed by using a polycarbonate (PC+GF) material with glass having a specific weight of 1.3.

The curvature radius r and the effective diameter R of the first lens LA1, LB1 were 17 mm and 20 mm, respectively, and the sag amount h of the first lens LA1, LB1 was about 3.25 mm. The projection amount of the first lens LA1, LB1 from the housing surface 18A, 18A was about 5 mm. The above condition 4 therefore was satisfied.

Measuring the gravity center A of the imaging body 12 in which the lenses LA1-7, LB1-7, right angle prisms PA, PB, lens barrel 26 and imaging elements 24A, 24B were combined, the gravity center P of the entire imaging system 10 and the gravity center B of the battery 14, the distance AP was 38 mm, and the distance BP was 26 mm. The weight m of the imaging body 12 was 17 g and the weight M of the battery 14 was 25 g. Moreover, measuring the distance AN between the gravity center A of the imaging body 12 and the center N of the shape of the omnidirectional imaging system 10 and the distance BN between the gravity center B of the battery 14 and the center N of the form of the omnidirectional imaging system 10, the distance AN was 35 mm and the distance BN was 29 mm. The above conditions 1-3 therefore were satisfied.

The shutter button was provided in the position S in which the distance PS becomes 10 mm. Even when the shutter button in the position S was pushed by the pushing force of 10 g, the photographing was stably performed.

[Embodiment 2]

The omnidirectional imaging system 50 having a spherical shape illustrated in FIG. 4 was obtained. Each of the image-forming optical systems had seven lenses in six groups. In this configuration, the second lens LA2, LB2 from the object side and the seventh lens LA7, LB7 from the object side were a plastic lens of E48R of Zeonex (registered trademark). The lens barrel 26 was formed by using a polycarbonate (PC+GF) material with glass.

The curvature radius r and the effective curvature radius R of the first lens LA1, LB1 were 17 mm and 20 mm, respectively, and the sag amount h of the first lens LA1, LB1 was about 3.5 mm. The above condition 4 therefore was satisfied.

Measuring the gravity center A of the imaging body 52 in which the lenses LA1-7, LB1-7, right-angle prisms PA, PB, lens barrel and imaging elements were combined, the gravity center P of the entire imaging system 50 and the gravity center B of the battery 54, the distance AP was 15 mm, and the distance BP was 10 mm. The weight m of the imaging body 52 was 17 g and the weight M of the battery 54 was 25 g. The distance AN was 0 mm and the distance BN was 25 mm. The above conditions 1-3 therefore were satisfied.

[Embodiment 3]

The omnidirectional imaging system 10 having a linear shape illustrated in FIGS. 5, 6 was obtained by using the lens barrel 26 and the image-forming optical systems 20A, 20B similar to Embodiment 1. The curvature radius r and the effective diameter R of the first lens LA1, LB1 were 17 mm and 20 mm, respectively, and the sag amount h of the first lens LA1, LB1 was about 3.25 mm. The projection amount of the first lens LA1, LB1 from the housing surface 18A, 18A was about 5 mm. The above condition 4 therefore was satisfied.

Measuring the gravity center A of the imaging body 12 in which the lenses LA1-7, LB1-7, right angle prisms PA, PB, lens barrel 26 and imaging elements 24A, 24B were combined, the gravity center P of the entire imaging system 10 and the gravity center B of the battery 14, the distance AP was 47 mm, and the distance BP was 32 mm. The weight m of the imaging body 12 was 17 g and the weight M of the battery 14 was 25 g. Moreover, measuring the distance AN between the gravity center A of the imaging body 12 and the center N of the shape of the omnidirectional imaging system 10 and the distance BN between the gravity center B of the battery 14 and the center N of the form of the omnidirectional imaging system 10, the distance AN was 42 mm and the distance BN was 37 mm. The above conditions 1-3 therefore were satisfied. The shutter button 22 was provided in the position S of the housing surface on the lens forming side in which the distance PS becomes 7.5 mm. Even when the shutter button in the position S was pushed by the pushing force of 10 g, the photographing was stably performed.

Although the embodiments of the present invention have been described above, the present invention is not limited thereto. It should be appreciated that variations may be made in the embodiments described by persons skilled in the art without departing from the scope of the present invention.

What is claimed is:

1. An imaging system comprising:
    an optical system;
    a shutter button; and
    a housing that holds the optical system, wherein
    a lens located on a most object side in the optical system projects from a part of the housing which is between the shutter button and the lens, and
    a center of the imaging system is disposed between a gravity center of the imaging system and the lens.

2. The imaging system according to claim 1, further comprising:
    an imaging body including the optical system and an imaging element; and
    a power supplier that supplies power to the imaging element, wherein
    the center of the imaging system is disposed between a gravity center of the power supplier and the lens.

3. The imaging system according to claim 2, wherein
    a weight m of the imaging body and a weight M of the power supplier satisfy the following condition:
    m<M.

* * * * *